United States Patent [19]
Chang et al.

[11] 3,760,387
[45] Sept. 18, 1973

[54] MAGNETIC BUBBLE DOMAIN SYSTEM USING MULTIPLE MAGNETIC SHEETS

[75] Inventors: Hsu Chang, Yorktown Heights; George J. Fan, Ossining, both of N.Y.

[73] Assignee: International Business Machines Corporation, Armonk, N.Y.

[22] Filed: June 22, 1972

[21] Appl. No.: 265,382

[52] U.S. Cl. 340/174 TF, 340/174 SR, 340/174 YC
[51] Int. Cl. ........................ G11c 11/14, G11c 19/00
[58] Field of Search ................ 340/174 TF, 174 SR, 340/174 YC

[56] References Cited

UNITED STATES PATENTS

| | | | |
|---|---|---|---|
| 3,643,238 | 2/1972 | Bobeck et al. | 340/174 TF |
| 3,676,872 | 7/1972 | Lock | 340/174 TF |

OTHER PUBLICATIONS

IBM Technical Disclosure Bulletin "High-Density Bubble Domain Memory" by Keefe et al., Vol. 13, No. 11, 4/71, p. 3295.
Bell System Technical Journal, "Multilayer Epitaxial Garnet Films for Magnetic Bubble Devices-Hard Bubble Suppression," by Bobeck et al., July-Aug. 1972, p. 1431-1435.
Bell System Technical Journal, "Effect of a Second Magnetic Layer on Hard Bubbles" by Rosencwaig, July-Aug. 1972; p. 1440-1444.

*Primary Examiner*—Stanley M. Urynowicz, Jr.
*Attorney*—Jackson E. Stanland

[57] ABSTRACT

A magnetic bubble domain system in which a single magnetic sheet, or a plurality of magnetic sheets, is used only for storage of information, while another magnetic sheet (memory sheet) is used for writing information into the storage magnetic sheet and for reading information from the storage magnetic sheet. The memory sheet contains circuitry for such functions as generation, decoding, sensing, clearing, storage, etc. The memory sheet can be positionally displaced with respect to the storage sheet to create bubble domains in the storage sheet and to detect the presence and absence of domains in the storage sheet. Means are provided to directly map information from the storage sheet to the memory sheet. Thus, this magnetic subsystem provides storage in a first magnetic sheet while the transducer circuits are in a second magnetic sheet which can be positionally displaced with respect to the first magnetic sheet for access of information into and from the first magnetic sheets.

33 Claims, 9 Drawing Figures

MAGNETIC BUBBLE DOMAIN SYSTEM USING MULTIPLE MAGNETIC SHEETS

BACKGROUND OF THE INVENTION

1. Field of the Invention

This invention relates to a magnetic bubble domain system and more particularly to one which separates the information storage function from the read and write functions.

2. Description of the Prior Art

Various magnetic bubble domain storage systems are shown in the art, as can be seen by referring to U. S. Pat. No. 3,460,116. As the art has developed, magnetic systems using on-chip decoding have evolved. Such a system is shown in copending application Ser. No. 158,232, filed June 30, 1971, now U.S. Pat. No. 3,689,902 and assigned to the present assignee.

In aforementioned copending application Ser. No. 158,232 a complete memory system is provided on a single magnetic chip in which read and write decoders control information flow into and from various storage areas. Sensing means are provided for each of the storage areas, and a clear means is provided for selectively removing information from any storage area.

In high capacity magnetic bubble domain storage systems, it is desirable to provide better utilization of high cost circuitry. Such circuitry includes the decoders, sensors, clear means, and domain generators. Better utilization is desirable in order to reduce the cost of these more expensive components. Together with these goals, it is desirable to provide a direct transfer of information from a storage area to a transducer which is shared among a plurality of storage locations. Immediate use of the information contained in the various storage locations is required in order to provide a fast access memory system.

Accordingly, it is primary object of this invention to provide a magnetic bubble domain system in which the information storage functions are located on a single magnetic sheet, or plurality of sheets, and the circuitry for performing read and write functions is located on another magnetic sheet.

It is another object of this invention to provide a bubble domain system in which an information storage sheet having no personality is used with a memory sheet having components thereon for writing and reading bubble domains on the storage sheet.

It is another object of this invention to provide an improved magnetic bubble domain system in which read and write circuitry is shared by a large area of information storage.

It is a further object of this invention to provide a magnetic bubble domain system for storage of large amounts of information which has reduced cost and better efficiency of expensive components.

These objects are obtained in the present system in which transducer circuitry (read and write components) is located on a magnetic sheet which can be movably positioned with respect to a plurality of magnetic storage sheets in order to write information into these storage sheets or remove information from these storage sheets. Thus, the read/write circuitry is shared among a plurality of storage locations, in a manner similar to magnetic recording systems.

BRIEF SUMMARY OF THE INVENTION

This magnetic system comprises a first magnetic sheet which is used primarily for storage of information in the form of magnetic bubble domains. That is, a plurality of storage locations are provided where information is represented by the presence and absence of magnetic bubble domains in each of the locations. For instance, a plurality of bit positions for shift registers (with or without propagation means) can be located on the storage chip. The storage chip does not generally contain the transducer-type circuits normally associated with a memory. That is, it normally does not contain domain generators, splitters, decoders, sensors, etc. It is used only for high density storage of domain information.

This contrasts with prior art bubble domain systems in which a magnetic sheet contains the storage medium, a permalloy pattern that facilitates dynamic movement of the domains, and circuits which are necessary for signal decoding and amplification. It has been recognized in the present invention that the storage function of a magnetic bubble domain material, unlike its semiconductor counterpart, is separable from the permalloy overlay and the other aforementioned circuits. That is, the magnetic sheet has an intrinsic storage capability.

In a mass storage environment, such as the present invention, activity is low and circuit utilization is maximized by separating the storage function of the magnetic sheet from the read/write function and by sharing the circuits among many mechanically addressed magnetic sheets. The permalloy pattern can also be shared among magnetic sheets. In this manner, the storage medium becomes an open structure, and when data is needed either an overlay or a bubble material (memory sheet) with an overlay is placed in proximity with the storage magnetic sheet. The information on the storage sheet is then transferred to the memory sheet using magnetic printing.

Alternatively, the memory sheet can be held stationary while the storage magnetic sheet is positionally displaced with respect to it. The memory sheet contains the usual components associated with a bubble domain memory. For instance, the memory sheet contains domain generators, read and write decoders, storage positions, domain sensors, domain clear means, and annihilators for destruction of domains. Such a memory has associated therewith a plurality of magnetic field sources and current drivers for performing memory functions. A memory of this type is described more fully in aforementioned copending application Ser. No. 158,232.

Information is written into the storage sheet and read from the storage sheet using the memory sheet in a manner which is somewhat similar to the use of a magnetic head in conjunction with a disc file. To write domain patterns into the storage sheet, nucleation techniques are used whereby a magnetic field generated by a component in the memory sheet causes nucleation of a domain in the storage sheet. Another nucleation technique uses the presence of two domains in the memory sheet to create a magnetic field sufficient to nucleate a domain in the storage sheet. Of course, a heat means, such as a laser, can be used to locally control the coercive force $H_c$ of the storage sheet in order to more easily nucleate domains therein. Another technique for writing domains in the storage sheet utilizes a domain generator in the storage sheet which is controlled by a component in the memory sheet.

To read domains located in the storage sheet, the storage domain information can be used to induce voltages in a conductor loop located in the memory sheet. This conductor loop is used as a 1/0 control for a domain generator in the memory sheet to produce domains in accordance with the presence and absence of domains on the storage sheet which are in flux-coupling proximity to the conductor loop.

Another technique for reading domains from the storage sheet utilizes a mapping of the domain information from the storage sheet to the memory sheet. That is, a complete pattern of domains in the storage sheet is reproduced in the memory sheet through the use of a transfer circuit. In a preferred embodiment, this transfer circuit comprises an overlay of soft magnetic elements which can be located on the memory sheet. Domains present in the storage sheet will have their magnetic field coupled to the memory sheet to influence a domain generator located on the memory sheet. This domain generator will produce domains each time it is affected by the magnetic field of a domain in the storage sheet, thereby mapping the domain information of the storage sheet into the magnetic memory sheet. Once information is mapped to the memory sheet, it can be treated as information in a conventional memory sheet, where the operations of decoding, shifting, sensing, and clearing are normally handled.

A displacement means is provided for moving the storage magnetic sheet and the memory sheet with respect to one another so that magnetic fields in each sheet will sufficiently couple the other magnetic sheet to influence operation therein. The displacement means includes a servo-control for properly aligning the memory sheet and the storage sheet for writing and reading at particular locations on the storage sheet. The customary channel electronics usually associated with disc and tape drives is also included to properly classify the information received from the storage means.

A block of information can be transferred from the storage sheet to the memory sheet using magnetic printing. After transfer of the information, various manipulations can be performed on the data. Once transfer is achieved, no further mechanical movement is required.

The storage sheet can be in the shape of a disc which is rotated relative to the memory sheet on which the transducer circuitry is located. As an alternative, the storage sheet can be in the form of a tape which is passed by the memory sheet in the manner of a tape/-head system. It should be understood that various embodiments are possible, using the concept of a storage medium and a memory medium separate therefrom for performing read and write functions.

Both the storage magnetic sheet and the memory sheet are provided with bias means for stabilizing the size of domains therein. The bias means can be the same for each magnetic sheet or can be separately provided for each magnetic sheet. For instance, permanent magnets adjacent to each sheet will provide the necessary bias.

These magnetic sheets are also provided with propagation field sources for moving domains within each of the sheets. The same magnetic coils can be used to provide the magnetic drive field for each magnetic sheet, or separate coils can be used.

The permalloy structure on the memory sheet can be used for propagation of domains in both sheets, and for other purposes. In addition, magnetic shielding can be provided between the sheets when it is desired to confine the permalloy structure action to only one sheet.

These and other objects, features, and advantages will be more apparent in the following more particular description of the preferred embodiments.

DETAILED DESCRIPTION OF THE PREFERRED EMBODIMENTS

Figure 1A:
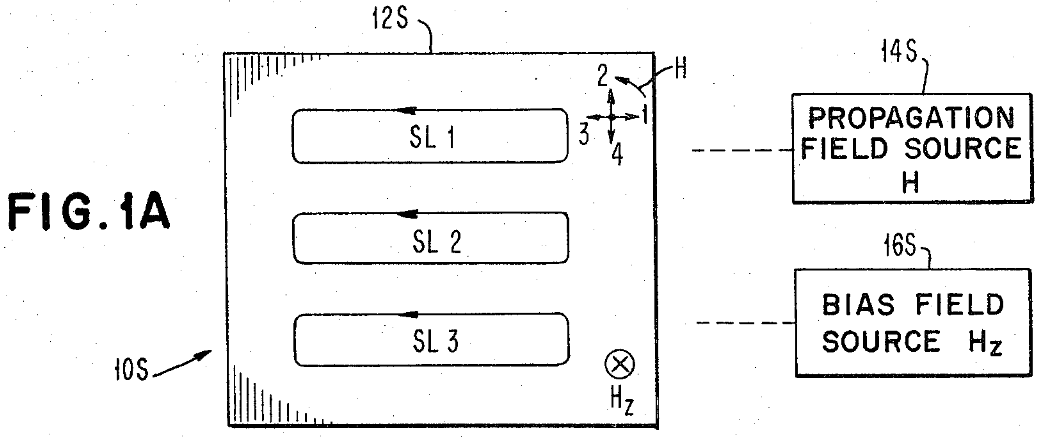
FIG. 1A shows a storage magnetic sheet in which a plurality of storage locations are provided in circulating loops.

FIG. 1A shows a magnetic storage sheet generally designated 10S. The storage sheet is comprised of a magnetic sheet 12S having uniaxial anisotropy with a direction of magnetization substantially normal to the plane of sheet 12S. Such a material can be any of the known bubble domain materials including but not limited to garnet films and orthoferrite films and plates. Generally, these films are located on a substrate which is not shown in this drawing (the plates are generally self-supporting).

Located in the sheet 12S are a plurality of storage locations, indicated here as storage loops SL1, SL2, and SL3. These storage locations can be shift register positions, or positions at which domains are nucleated in sheet 12. Further, any number of storage loops and storage positions can be provided. Preferably, many storage positions will be provided in order to obtain high density storage.

A propagation field source 14S provides a magnetic field H which is in the plane of magnetic sheet S and is used to propagate domains in the sheet in a manner which is well known. That is, the storage loops are comprised of an overlay which causes domains to propagate in the loops in the direction of the arrows when a reorienting magnetic field H exists in the plane of storage sheet 12S.

A bias field source 16S provides a magnetic bias field $H_z$ normal to magnetic sheet 12S, for stabilization of domains in sheet 12S. Preferably, the bias field source is a permanent magnet located adjacent sheet 12S, as is well known in the art. Additionally, bias field source 16S could be a current carrying coil surrounding sheet 12S for provision of magnetic field $H_z$.

Typically, the magnetic storage portion 10S of the subject apparatus provides storage of information in the form of the presence and absence of domains in magnetic sheet 12S. This means that transducer circuitry normally associated with magnetic bubble domain apparatus is not present on sheet 12S. For the purposes of this invention, it is desirable that the number of functions performed in magnetic storage portion 10S be limited so that high storage density can result. This means that storage system 10S is relatively cheap to manufacture and maintain, since it is primarily a storage medium which will be accessed by a separate read/write magnetic sheet, to be described with respect to FIG. 1B.

FIG. 1B

Figure 1B:
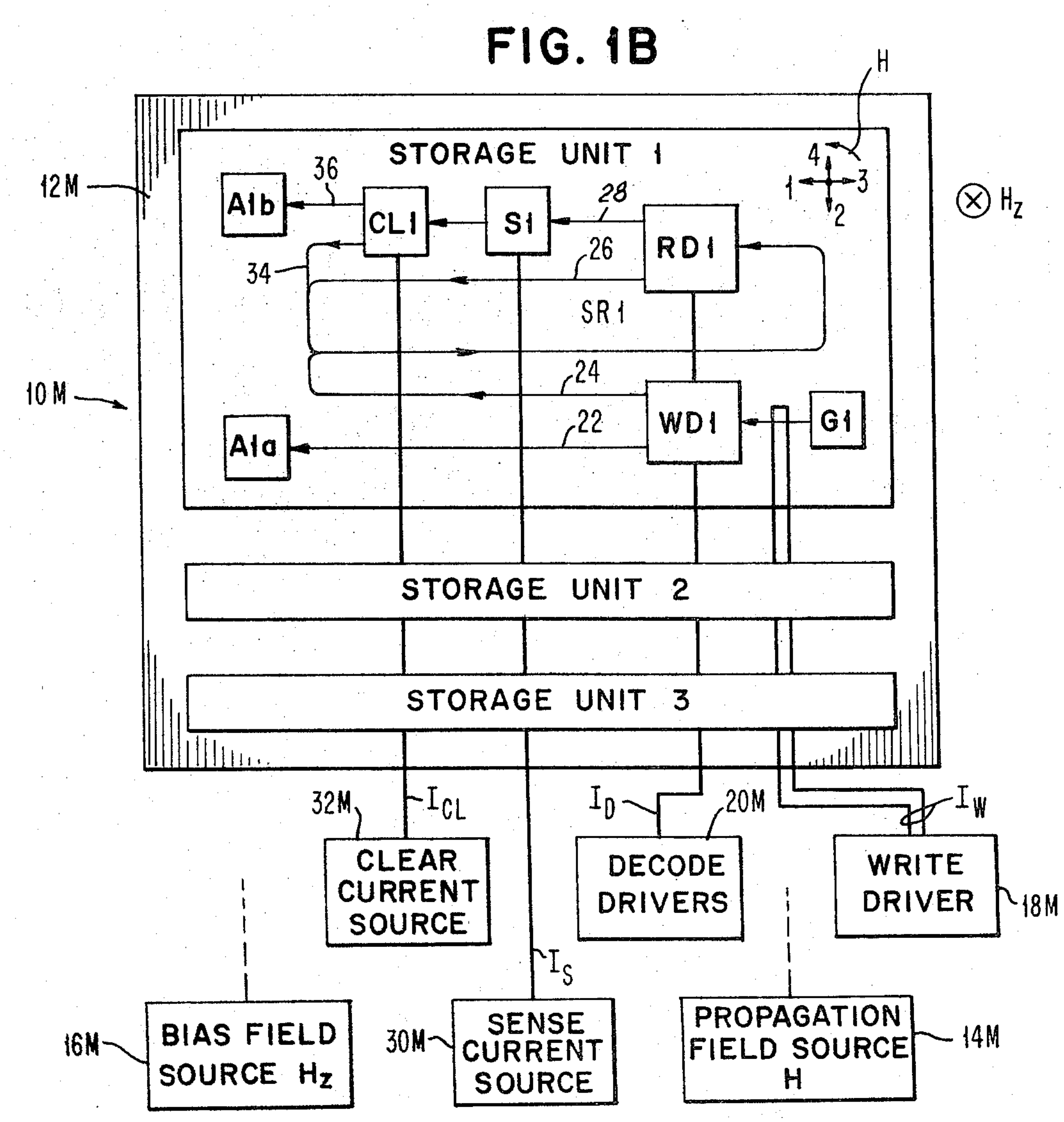
FIG. 1B shows the memory magnetic sheet having generation, decoding, sensing, clearing and annihilation means therein.

FIG. 1B shows the magnetic memory portion of the subject magnetic bubble domain system. The memory portion is generally designed 10M, where "M" is used to indicate the memory portion of the overall system. Accordingly, the designation S is used for those components which are associated with the storage portion of this system. Wherever possible, the same numeral designations will be used for components having an identical function, and the suffix M or S will be used to describe the location of this component as being in the memory or storage portion of the system, respectively.

Memory portion 10M is comprised of a magnetic sheet 12M which is a garnet or orthoferrite sheet having characteristics similar to the magnetic sheet 12S used in the storage portion. Located in magnetic sheet 12M are a plurality of storage units 1, 2, and 3. Each storage unit comprises the same components and only storage unit 1 is shown in detail. This type of memory configuration is known in the art and reference is made to aforementioned copending application Ser. No. 158,232.

In more detail, storage unit 1 contains a domain generator G1 which produces a domain pattern in accordance with current pulses $I_w$ received from write driver 18M. This pattern of domains propagates to a write decoder WD1 which operates in accordance with the current $I_D$ received from decode drivers 20M.

Depending upon the current $I_D$ to decoder WD1, domains are either propagated to annihilator A1a via path 22 or are sent to the storage area (shift register SR1), via propagation path 24. After passage through SR1, the domains enter read decoder RD1.

Depending upon the currents $I_D$ supplied to decoder RD1, the domains are either returned to shift register SR1 via propagation path 26 or are propagated to sensor S1 via propagation path 28. Sensor S1 can be any of a number of known bubble domain sensors, and is preferably a magneto-resistive sensor such as that described in copending application Ser. No. 78,531, filed Oct. 6, 1970, now U.S. Pat. No. 3,691,540 and assigned to the present assignee. In this type of sensing, a sense current $I_s$ is provided by sense current source 30M when domains are adjacent a magnetoresistive sensing element in sensor S1. The presence and absence of domains in flux-coupling proximity to the sensing element is indicated by a change in resistance of the sensing element which can be ultimately manifested as a current or voltage pulse.

After being sensed, the domains are propagated to a clear means CL1 which operates under control of currents $I_{CL}$ provided by clear current source 32M. The clear means CL1 is a domain switch which causes domains to propagate in one of a plurality of paths. Depending upon the currents $I_{CL}$, domains either return to SR1 via propagation path 34, or propagate to an annihilator A1b via path 36.

Thus, each storage unit provides the functions of generation, decoding, storage, sensing, clearing, and annihilation. These are the normal functions provided in a bubble domain memory and are the functions which require more extensive propagation overlays and associated drive circuitry. As such, they are contrasted with the simple basic storage function which primarily occurs in the storage portion 10S of this system.

FIG. 2

Figure 2:
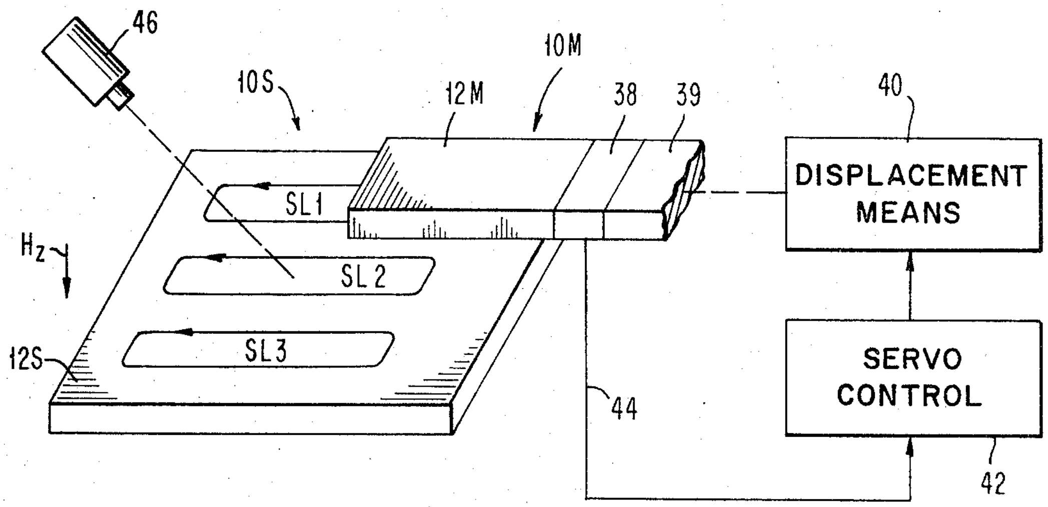
FIG. 2 shows a system arrangement in which the memory sheet can be positionally displaced with respect to the storage sheet to read information from the storage sheet or write information into the storage sheet.

FIG. 2 shows a system arrangement where the memory portion 10M is located in flux-coupling proximity to domains in storage portion 10S. Connected to memory magnetic sheet 12M are the associated drivers and other circuitry generally designated 38. This circuitry includes the clear current source 32M, sense current source 30M, decode drivers 20M, and write driver 18M. Also, included in unit 38 are the necessary channel electronics which are used to define the precise location of memory portion 10M with respect to selected storage locations in magnetic storage sheet 12S. For instance, certain domains in storage sheet 12S can be used to provide servo signals to precisely indicate the location of memory unit 10M. Such systems are well known in the disc file technology and will not be explained in more detail here.

The memory unit 10M is mechanically connected via arm 39 to a displacement means 40 which receives control signals from a servo control 42. Servo control 42 is responsive to electrical signals developed by memory unit 10M which are sent to servo control 42 via conductor 44. Depending upon the location of memory unit 10M, error signals are developed which activate displacement means 42 to provide positioning of memory unit 10M, in accordance with known principles.

A heat means 46, which could be a laser, is positionable with respect to storage magnetic sheet 12S, for direction of electromagnetic energy to selected locations on sheet 12S. This energy is used to locally lower the coercive field of the storage sheet to aid nucleation of domains in the storage sheet, when it is desired to write information into the storage sheet. Heat means 46 is not a necessary requirement, but can often be used to advantage for nucleation of domains in sheet 12S. The laser can also be placed adjacent to the nucleation means and moved with it.

TRANSFER OF INFORMATION FROM STORAGE SHEET TO MEMORY SHEET

FIG. 3

Figure 3:
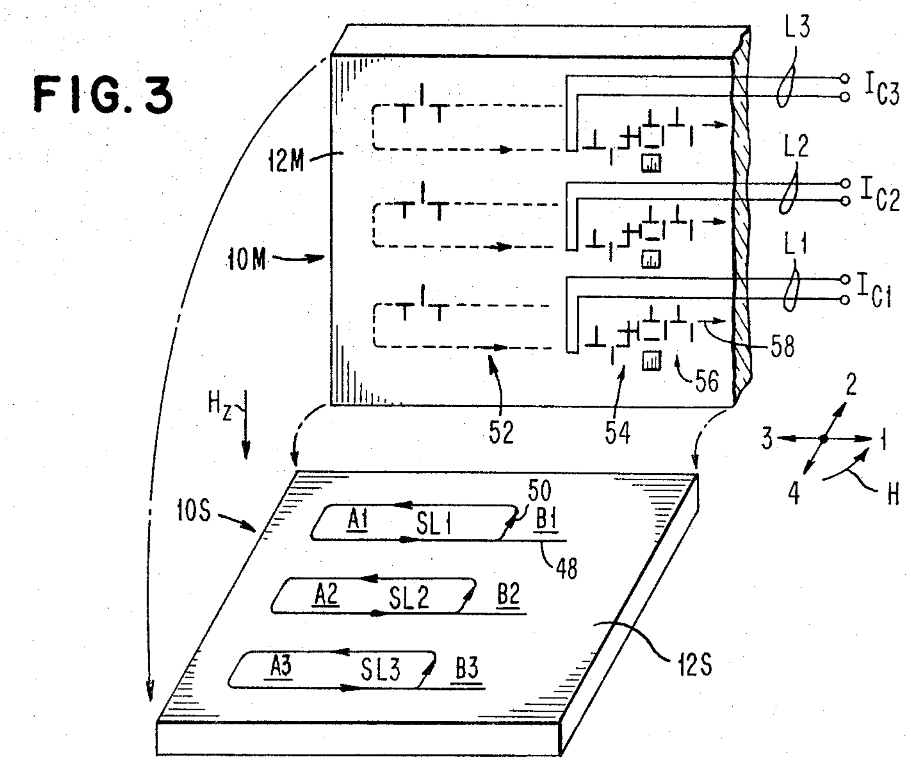
FIG. 3 shows a system arrangement for mapping information from the storage sheet to the memory sheet using a pattern located on the memory sheet which controls domain propagation in the storage sheet as well as information transfer to the memory sheet and propagation in the memory sheet.

FIG. 3 shows an arrangement for transferring domains from the storage magnetic sheet 12S to the memory magnetic sheet 12M. Overlay patterns located on the memory sheet are used to provide propagation in both storage sheet 12S and memory sheet 12M, as well as to provide the transfer function by which domain information is mapped into the magnetic sheet 12M from the storage sheet 12S.

In more detail, the storage sheet 12S has a plurality of storage loops SL1–SL3 located therein. Domains propagate around these loops in the direction of the arrows. Normally, domains propagate in the left-hand portion of each storage loop; for example, domains propagate around portion A1 in loop SL1 and will not normally propagate in portion B1 of storage loop SL1. Domain motion in storage sheet 12S is controlled by the overlay pattern located on magnetic sheet 12M.

Domains in any storage loop will move from portion A of that loop to portion B in response to current in control conductors located on memory sheet 12M. For instance, the presence of a current $I_{CL}$ in conductor loop L1 will cause domains propagating in storage loop SL1 to propagate along path 48 (portion B1) rather than along path 50 which would be followed in the absence of a current $I_{CL}$ in loop L1. Current controlled domain steering is more fully described in copending application Ser. No. 267,842, filed June 30, 1972 and assigned to the present assignee.

In a similar fashion as that described with respect to control loop L1, control loop L2 is used to keep domains in portion A2 of storage loop SL2 or to propagate domains in portion B2 of this storage loop. Consequently, it is readily apparent that an overlay pattern located on memory sheet 12M and generally designated by the numeral 52 provides domain propagation in storage sheet 12S. This propagation occurs in a known fashion due to the presence of the rotating magnetic drive field H. Alternatively to the current control loop to select an SL loop for transfer, all SL loops are duplicated onto the memory sheet. Then, a decoder is activated to select one duplicated loop.

When domains propagate in portion B1 of storage loop SL1, they interact with domains located on magnetic sheet 12M under control of the transfer portion 54 of the overlay located on memory sheet 12M. As will be explained more fully later, this causes splitting of a domain on memory sheet 12M which is then propagated in sheet 12M along the direction of the arrow 58.

Thus, the apparatus of FIG. 3 provides controlled domain propagation in all storage loops within sheet 12S. If domains in the storage sheet are propagated to selected areas of that sheet their stray magnetic fields will influence the bubble domains in magnetic sheet 12M. This in turn will produce further bubble domains in sheet 12M with the result that the domain information on storage sheet 12S will be mapped into magnetic sheet 12M.

A similar overlay of magnetic elements is provided for propagation and control of domains in storage loops SL2 and SL3. Domains in these storage loops can be mapped into corresponding regions of memory sheet 12M.

FIG. 4

Figure 4A:
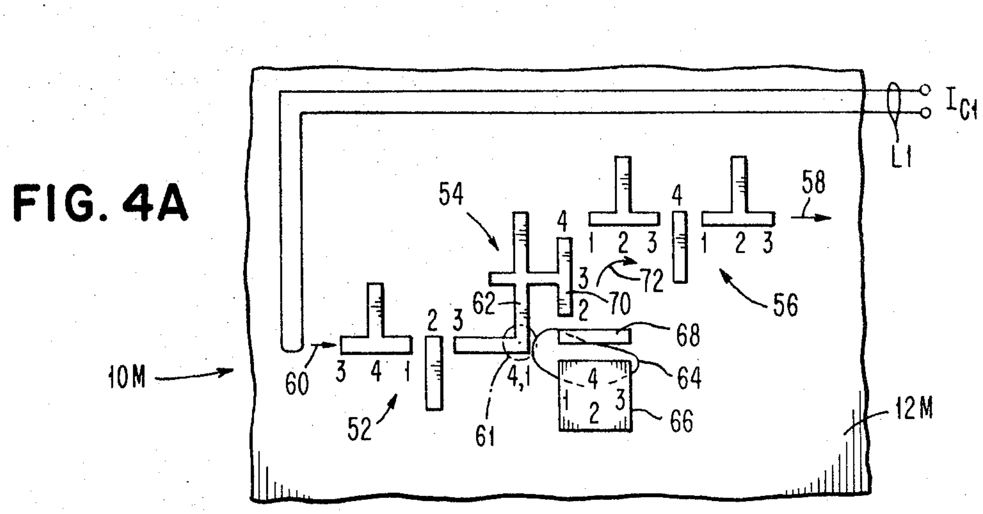
FIG. 4 shows an embodiment for the propagation and transfer structure of FIG. 3, using an overlay comprised of magnetically soft elements.
Figure 4B:
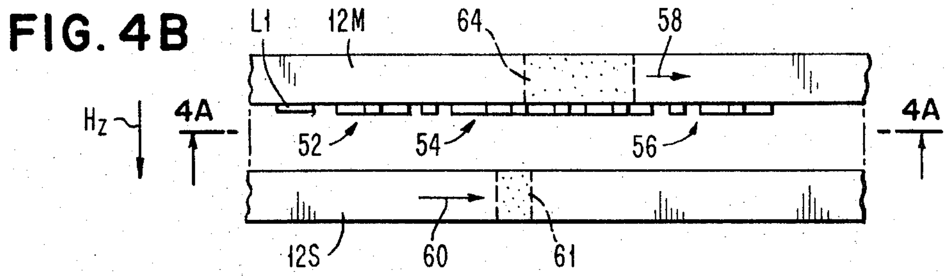

FIG. 4A is an exploded view of a portion of memory unit 10M which shows an overlay of soft magnetic elements on sheet 12M which are used for propagation of domains in magnetic sheets 12S and 12M, as well as for transferring domain information from sheet 12S to sheet 12M. FIG. 4B is a side elevational view of the structure of FIG. 3, which illustrates the operation by which domain information is mapped into memory magnetic sheet 12M.

The overlay of magnetically soft elements (permalloy) shown in FIG. 4A is associated with storage loop SL1 in sheet 12S. The magnetic overlay performs a variety of functions: portion 52 of the overlay is used for propagation of domains in storage sheet 12S; portion 54 of the overlay is used for transferring domain information from storage sheet 12S to memory sheet 12M; and portion 56 is used for propagation of domains in memory sheet 12M. For instance, domains located in storage sheet 12S are propagated in the direction of arrow 60 in storage sheet 12S. They are made to propagate in portion (B1) of the storage loop SL1 due to a current present in control conductor L1.

Due to the presence of the rotating in-plane magnetic field H, a series of attractive magnetic poles created in different locations of magnetic overlay 52 moves domains in sheet 12S in the direction of arrow 60. These domains propagate by transfer overlay 54 and are trapped at the elbow of L-bar element 62. This is indicated by the bubble domain 61, shown in phantom in FIG. 4A. During this time, a "mother" domain 64 in sheet 12M is contained by and circulated around magnetically soft element 66. During phase one of the rotating field, the storage domain 61 located at the elbow of the L-bar 62 bridges domain 64 over from permalloy pattern 66 to permalloy pattern 68. The continuing rotation of field H further stretches domain 64. This stretching action, coupled with a pinching effect due to the magnetic field of the domain 61, causes domain 64 to split. As propagation field H continues to rotate, the split portion of the "mother" domain 64 propagates under element 70 in sheet 12M and moves in the direction of arrow 72. It continues its propagation in accordance with magnetic overlay 56 and will move in the direction indicated by arrow 58 in magnetic sheet 12M.

Thus, a transfer of domain information from sheet 12S to sheet 12M occurs due to the effect of the magnetic domains in sheet 12S on a "mother" domain located in sheet 12M. The stray fields of domains in sheet 12S provide a pinching field to split domains located in sheet 12M. In the absence of the pinching field from domains in sheet 12S, the mother domains in sheet 12M will not split. In this way domain information will be mapped to sheet 12M.

Write Operation

Figure 6:
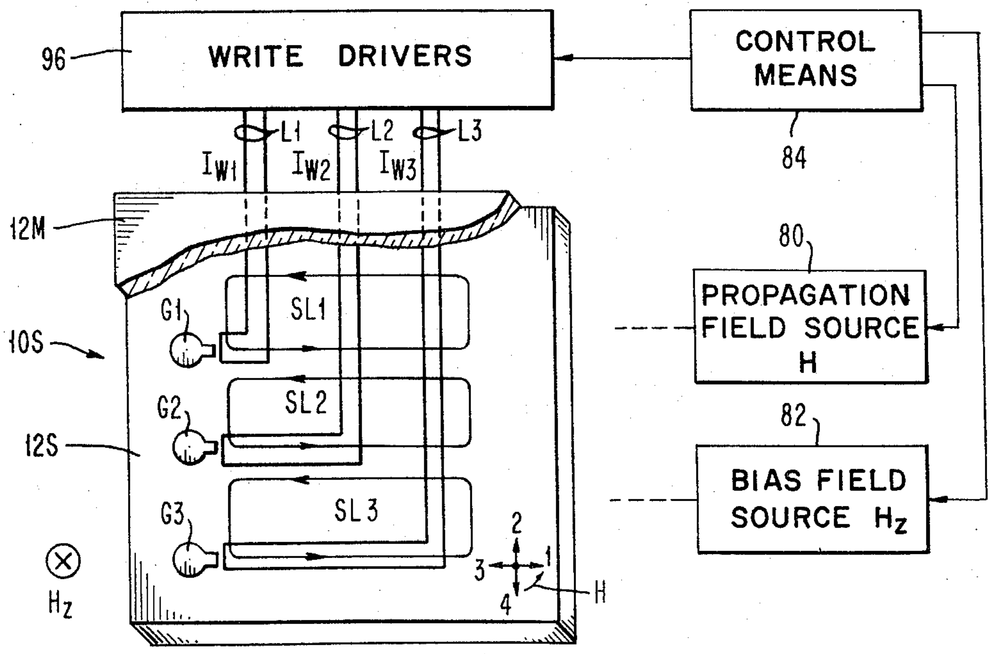
FIG. 6 shows an embodiment for writing domains in the storage sheet using domain generators located on the storage sheet which are controlled by components on the memory sheets.
Figure 5A:
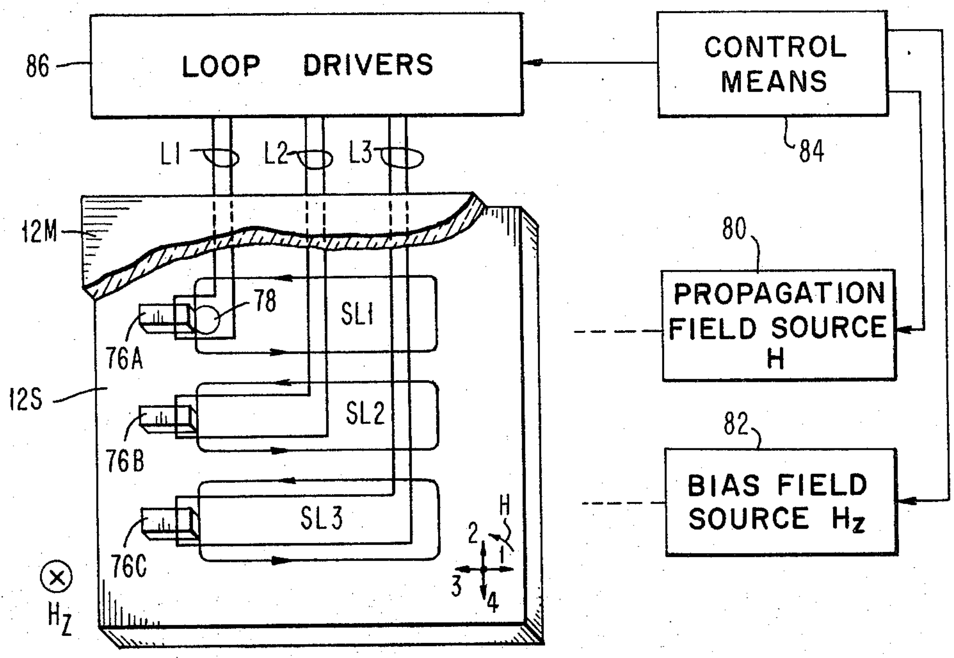
FIGS. 5A and 5B show two embodiments for writing domains in the storage sheet using domain nucleation.
Figure 5B:
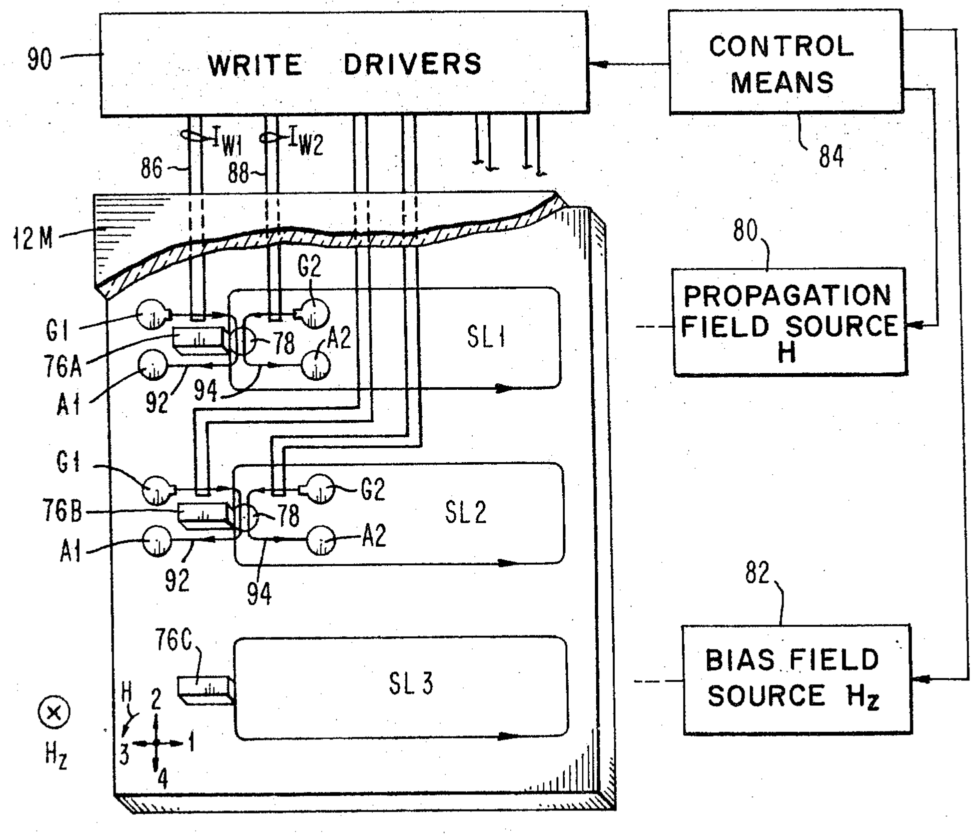

Domains can be formed in the storage portion 10S using either direct nucleation of domains in magnetic sheet 12S or by splitting domains already present in magnetic sheet 12S. For both nucleation and splitting, these functions are controlled by circuitry located in memory portion 10M. That is, nucleating magnetic fields in sheet 12S are produced by components on memory portion 10M, and magnetic fields sufficient for splitting domains in sheet 12S are produced by circuitry on memory portion 10M. Two techniques for nucleating a domain in selected portions of magnetic sheet 12S are shown in FIGS. 5A and 5B, while a technique for writing domains in magnetic sheet 12S by a splitting operation is shown in FIG. 6. These particular techniques will now be examined in more detail.

FIG. 5A

In this writing technique, the method and means presented in U. S. Pat. No. 3,662,359 are used. That is, domains are nucleated in the magnetic storage sheet 12S by creating a localized magnetic field normal to magnetic sheet 12S which is oppositely directed with respect to the bias field $H_z$ in that magnetic sheet. This localized field is created by the action of an external magnetic field created by components on memory sheet 12M which acts upon magentic elements (76A, 76B, 76C) located on storage sheet 12S. The magnetic bias field $H_z$ is then reduced until the magnetic field at the end of the magnetic elements exceeds the nucleation field $H_n$ in sheet 12S. At this time a domain will be created locally in the region of the magnetic element on sheet 12S. This domain diameter is then stabilized by increasing the bias field $H_z$.

In more detail, storage portion 10S comprises a magnetic sheet 12S on which is located a plurality of storage loops SL1, SL2, and SL3 as were shown in FIG. 1A. Located adjacent the storage loops are magnetic elements 76A, 76B, and 76C, respectively. Generally, these elements are comprised of a magnetically soft material such as permalloy. Domains, such as domain 78, are nucleated at one end of these elements and are then propagated directly into the storage loops, for instance loop SL1 as shown in FIG. 5A. Element 76A can be a part of the propagation circuitry used to move domains in SL1 in response to a rotating magnetic field H in the plane of magnetic sheet 12S.

A propagation field source 80 provides the magnetic drive field H which is in the plane of magnetic sheets 12S and 12M. In this drawing, magnetic sheet 12M is partially broken away to show the conductor loops L1, L2, and L3 which are located on its lower surface. The conductor loops L1–L3 are used to provide external magnetic fields which couple to magnetic elements 76A–76C respectively, in order to create localized magnetic fields in sheet 12S for nucleation of domains therein. The closeness of sheets 12M and 12S is such that magnetic fields created in either of the magnetic sheets will couple to the other magnetic sheet in order to influence an operation on the other sheet. That is, a magnetic field from the storage sheet will influence the memory sheet for magnetic readout, and a magnetic field from the memory sheet will influence the storage sheet for creation of domains therein.

In FIG. 5A, a bias field source 82 provides magnetic bias field $H_z$ which exists normal to both magnetic sheets 12S and 12M. The propagation field source 80 and bias field source 82 are regulated by outputs from control means 84.

The localized magnetic fields produced in sheet 12S for creation of domains therein are produced by currents in loops L1, L2, and L3. The conductor loop L1 is used to nucleate domains at the end of permalloy element 76A, while loop L2 is used to nucleate domains at the end of permalloy element 76B. Correspondingly, loop L3 is used to nucleate domains at the end of permalloy element 76C. These loops receive current inputs from the loop drivers 86 which are under control of output pulses from control means 84. Thus, domains can be nucleated in any or all of the storage loops simultaneously.

In operation, a magnetic field created by any of the loops L1–L3 produces a domain at the end of the appropriate permalloy element 76A–76C, in accordance with the teachings of U. S. Pat. No. 3,662,359. After the domain is nucleated, it will move along the appropriate storage loop in response to the rotation of magnetic drive field H, in accordance with known principles.

Magnetic sheet 12M is shown having a broken right-hand edge to indicate that the conductor loops L1–L3 used for domain nucleation form only a portion of the circuitry on that magnetic sheet. The remainder of magnetic sheet 12M can be used for provision of the various functions outlined in FIG. 1B, or FIGS. 3 and 4A, 4B.

FIG. 5B

In the embodiment of FIG. 5B, domains are nucleated in magnetic sheet 12S, using the method and apparatus of U. S. Pat. No. 3,662,359. The embodiment of this figure differs from that of FIG. 5A in that the external magnetic field used for nucleating a domain in magnetic sheet 12S is provided by bubble domains in magnetic sheet 12M, rather than by current loops located on magnetic sheet 12M.

Much of the structure used in the embodiment of FIG. 5B is the same as that used in the embodiment of FIG. 5A. Accordingly, the same reference numerals will be used whenever possible.

As in FIG. 5A, storage portion 10S is comprised of a magnetic sheet 12S having permalloy elements 76A, 76B, and 76C thereon. Domains are nucleated at the ends of these elements, as is illustrated by domain 78 nucleated at the end of permalloy element 76A. Domains nucleated in magnetic sheet 12S are propagated around the appropriate storage loops SL1, SL2, and SL3.

A magnetic bias field $H_z$ exists across the magnetic sheets 12S and 12M, and a propagation magnetic field H exists in the plane of these magnetic sheets. These magnetic fields are produced by the bias field source 82 and propagation field source 80, respectively. These magnetic field sources are operated by pulses received from control means 84.

The localized magnetic fields produced at the ends of the permalloy elements 76A–76C are produced by the action of magnetic fields of domains in sheet 12M on the permalloy elements 76A–76B. Each write component on sheet 12M includes domain generators G1, G2 and annihilators A1, A2. Sheet 12M is broken away to illustrate the location of the write components on sheet 12M with respect to the permalloy elements 76A–76C on sheet 12S. For ease of drawing, only the write components associated with loops SL1 and SL2 are shown in FIG. 5B, although it should be understood that another write component will be on magnetic sheet 12M for nucleation of domains in storage loop SL3.

The write component shown on magnetic sheet 12M is used to nucleate domains 78 at the end of permalloy elements 76A and 76B. It is comprised of domain generators G1 and G2. These domain generators operate under control of currents $I_{w1}$ and $I_{w2}$ in conductor loops 86 and 88, respectively. These currents are produced by write drivers 90 which operate under control of control means 84.

The domains produced by these generators propagate in sheet 12M along paths 92 and 94, which brings the domains in close proximity to one another. The combined magnetic field produced by these domains is sufficient to provide a localized magnetic field at the end of permalloy elements 76A and 76B for nucleation of domains 78 in accordance with the teaching of U. S. Pat. No. 3,662,355. Only when these domains exist in close proximity to one another in magnetic sheet 12M will their combined magnetic field be sufficient for nucleation of a domain 78 in sheet 12S.

After being propagated in paths 92 and 94, the domains are sent to annihilators A1 and A2 respectively. Of course, these domains can be used for other functions in magnetic sheet 12M, instead of being annihilated.

As is the case with the embodiment of FIG. 5A, magnetic sheet 12M is shown broken to also indicate that additional components for other functions are usually provided on magnetic sheet 12M.

FIG. 6

FIG. 6 illustrates an embodiment in which a magnetic field produced by a component in the memory portion controls a domain generator in the storage portion, for selective generation of domain information in storage sheet 12S.

In more detail, storage portion 10S is comprised of a magnetic sheet 12S having a plurality of storage loops SL1, SL2, and SL3 thereon. These are the same as the storage loops described with respect to FIG. 1A. Associated with each of the storage loops is a domain generator G1, G2, and G3 located on sheet 12S. These generators produce domains for every cycle of the rotating propagation field H, in a manner well known in the art.

The propagation field H and bias field $H_z$ are the same as were described with respect to FIGS. 5A and 5B. Therefore, the same reference numerals are used to describe these components.

In FIG. 6, a propagation field source 80 produces the rotating drive magnetic field H while a bias field source 82 produces the magnetic bias field $H_z$. These field sources operate under control of means 84.

The domain generators G1–G3 each produce a domain during each rotation cycle of drive field H. However, whether a domain actually enters any of the storage loops SL1–SL3 depends upon the magnetic field produced by components in memory portion 10M.

A plurality of current loops L1, L2, and L3 provide magnetic fields for generators G1, G2, and G3, respectively. These loops L1–L3 are located on the underside of sheet 12M, which is shown broken away to illustrate their location with respect to generators G1–G3, respectively. Depending on the presence and absence of currents $I_{w1}$, $I_{w2}$, and $I_{w3}$, the domains produced by generators G1, G2, and G3, respectively, will or will not be propagated to the associated storage loops. For instance, the current $I_{w1}$ in loop L1 will produce a magnetic field to destroy a domain generated by G1. If current $I_{w1}$ is not present at that time, the domain produced by generator G1 will propagate into storage loop SL1. Currents $I_{w1}$, $I_{w2}$, and $I_{w3}$ are produced by write drivers 96, which operate under control of means 84.

Although only the loops L1–L3 are shown on memory sheet 12M, it should be understood that other circuitry can be present on this magnetic sheet. This would include all of the components illustrated with respect to FIGS. 1B, 3, 4A and 4B.

Read Operation

The read operation is generally performed using the transfer circuits illustrated in FIGS. 3, 4A and 4B. That is, domains in storage sheet 12S cause generation of domains in memory sheet 12M.

Another technique for reading information from storage sheet 12S uses the voltage induced in a conductor located on magnetic sheet 12M. The voltage induced in the conductor by a domain in storage sheet 12S will depend upon the number of flux lines which couple the conductor loop and the change with time of these flux lines.

Example

In considering the open structure storage sheet, the requirement of the storage material is as follows: (1) For the magnetization to be normal to the sheet plane, the material must have a uniaxial coercive force, $$H_k > 4\pi M_s \quad 1.$$

at the room temperature. (2) The nucleation coercive force should be comparable to conventional bubble material enabling the transfer of the data from the R/W (memory) to the storage sheet and vice versa. (3) It is preferable to have in a bubble material a $Hc/4\pi M_s \sim 0.001$ so that dynamic movements of the bubble can be induced in the sheet plane.

The R/W (memory) sheet design is very similar to a conventional bubble memory chip. This sheet can consist of a single crystal substrate on which an epitaxial single magnetic film is grown. A permalloy pattern is placed on the crystal with bubble generators and detectors connected to the various circuits used. This sheet must have an in-plane coercive force to facilitate the dynamic movement of the bubbles.

The packing density on the storage sheet is limited by mechanical registration problems. The vertical separation as well as in-plane registration are related to *d*, the bubble diameter. The registration specification increases linearly with bubble diameter while the packing desnity is proportional to square of the diameter; hence a very small bubble diameter is clearly desirable. For illustration, an example is considered using $\pi 5\mu$ diameter bubble system. In a $5\mu$ bubble diameter system 0.4 megabutes (3.2 megabits) of data can be stored on a 1 $inch^2$ area. The 0.4 megabytes can be ordered in 800 loops of 512 bit shift registers, and a data rate in excess of 1 MHz in within the state of the art. Using oen single channel I/0 from the storage sheet, the 800 loops can be decoded by a 10 stage decoder, with some 20 interconnections.

In the $5\mu$ bubble system, the vertical separation during transfer of domain information to the memory sheet has to be maintained with one-half the diameter of the bubble. The field involved can be calculated in accordance with known principles. The field at a point at a distance is small compared with the diameter of the bubble, and can be computed by integrating over the magnetic charge contribution over the bubble surface. For small distance, the integral is essentially over the complete half plane (the contribution for charges at large angles is negligible). The contribution of the opposite charge on the bottom of the sheet is not important until the separation reaches one-half of that of the bubble radius. For an optimum bubble material the sheet thickness is the same as the radius. At one radius separation the field fall-offs at most by 50 percent. An external field, whether orthogonal or parallel to the field plane, can assist magnetic printing. The magnetic bubble transfer is intrinsically less sensitive compared to the magnetic recording since the field fall-off at small distances is less than for magnetic recording, due to a different orientation of the magnetic dipole.

The transfer process limits the separation of the sheets to ~1 radius of the storage bubble, or 2.5$\mu$ in the case of 5$\mu$ bubbles. In printing, there is also an in-plane registration requirement. In a conventional structure, a misregistration of one bubbly diameter does not have adverse effect, since the permalloy pattern will restore the bubble to the proper position, thereby correcting the misregistration. Other schemes can be used to improve the in-plane registration problem and a 10$\mu$ static registration does not appear excessive. For instance, bubbles can be expanded prior to transfer to reduce mechanical tolerance.

System Configurations

With the technology capability described above, a number of system configurations can be designed.

A large memory can be attached to an automatic archive to achieve a system configuration. The automatic archive consists of 2 inches storage sheet with 5$\mu$ diameter bubbles. 1.6 megabytes of data is stored on a given sheet. 30 sheets are placed in a cartridge. A single cartridge contains a data set of 48 megabytes.

A backing store consisting of 48 megabytes (equivalent to one cartridge) is constructed with the same technology. The backing store consists of 30 auxiliary sheets with personality and a rotating magnetic field but no interconnecting circuits, and an additional 30 fully populated bubble sheets as active memory. The data can be transferred from the storage sheet to an auxiliary bubble sheet from which the data contained in the loops is selectively transferred to the R/W (memory) chip. In most cases only a small section of the information on auxiliary sheets will be transferred to the backing store, Thus, interference due to unnecessary data in the memory is avoided and there is left sufficient empty space in the memory for processing. If a low coercive force polycrystalline bubble film is developed, the need for the auxiliary bubble chip is eliminated.

What has been described is a magnetic domain system using a storage portion and a memory portion, where separate magnetic sheets are assigned to each portion. Means are provided for nucleating domains in each storage sheet and for reading information obtained in the storage sheet. In addition, means is described for transferring information in the form of domains to the memory sheet to achieve a mapping of information from the storage sheet to the memory magnetic sheet.

It should be understood by those skilled in the art that this type of system can be used with a multiple number of storage magnetic sheets, as well as a multiple number of memory magnetic sheets. Thus, a structure similar to a disc file having multiple read/write heads will be obtained. There may be advantages to a system using multiple memory magnetic sheets for the memory portion of this storage system. For instance, access to individual portions of the storage magnetic sheet will be quicker, and less control circuitry will be required.

What is claimed is:

1. A magnetic bubble domain apparatus, comprising:
a first magnetic sheet in which said domains exist, said first sheet having a plurality of magnetic storage positions therein, the presence and absence of domains in said storage positions being indicative of information,
a second magnetic sheet in which said domains can exist, said second magnetic sheet having thereon:
write components for generating domains in selected positions of said first magnetic sheet thereby writing information into storage, and
read components for detecting the presence and absence of domains at selected positions in said first magnetic sheet,
displacement means for positioning said first and second magnetic sheets relative to one another for performance of said read and write functions.

2. The apparatus of claim 1, where said write component is comprised of a conductor loop located on said second magnetic sheet for creation of magnetic fields coupling said first magnetic sheet.

3. The apparatus of claim 1, where said write component is comprised of propagation means for moving domains in said second magnetic sheet into close proximity to one another, the net magnetic field produced by said domains in said second sheet providing a magnetic field coupling said first magnetic sheet.

4. The apparatus of claim 1, where said first magnetic sheet has domain generators thereon, and said second magnetic sheet has a control means thereon for controlling the generation of domains in said first magnetic sheet.

5. The apparatus of claim 1, including transfer means for transferring information represented as the presence and absence of domains in said first magnetic sheet to said second magnetic sheet.

6. The apparatus of claim 5, where said transfer means is comprised of an overlay of magnetically soft elements located in juxtaposition to said second magnetic sheet.

7. The apparatus of claim 5, where said overlay includes magnetically soft elements for propagation of domains in said first and second magnetic sheets.

8. The apparatus of claim 1, including a propagation means for moving domains in said first magnetic sheet, said propagation means being adjacent said first magnetic sheet.

9. The apparatus of claim 1, where said second magnetic sheet has propagation means associated therewith for movement of domains in said first and second magnetic sheets.

10. The apparatus of claim 9, where said propagation means is an overlay of magnetically soft elements adjacent said second sheet, said apparatus further including magnetic field means for producing a reorienting magnetic field coupling said overlay elements.

11. The apparatus of claim 1, where said second magnetic sheet has means thereon for decoding, generation, and storage of bubble domains therein.

12. A bubble domain apparatus, comprising:
at least one storage magnetic sheet for storage of magnetic bubble domains at selected areas therein,
a second magnetic sheet in which magnetic bubble domains can exist, said second sheet having circuitry thereon for creation of magnetic fields which couple said storage magnetic sheet,
displacement means for positioning said storage magnetic sheet and second magnetic sheet sufficiently close that said magnetic fields couple to said storage magnetic sheet.

13. The apparatus of claim 12, where said storage magnetic sheet and said second magnetic sheet are located within about a bubble domain radius of each other, in substantially parallel planes.

14. The apparatus of claim 12, where said second magnetic sheet has means thereon for moving domains in said storage magnetic sheet and in said second magnetic sheet.

15. The apparatus of claim 12, where said second magnetic sheet has thereon transfer means for producing a magnetic domain in said second magnetic sheet whose stray magnetic field couples with the stray magnetic field of a domain in said storage sheet.

16. The apparatus of claim 15, where said transfer means is comprised of an overlay of magnetically soft elements, and a magnetic field source for providing a reorienting magnetic field in the plane of said second magnetic sheet.

17. The apparatus of claim 12, including means for moving domains in selected areas of said storage sheet to positions where they interact with domains in said second sheet.

18. The apparatus of claim 12, where said circuitry includes current carrying control loops located on said second magnetic sheet for producing magnetic fields which couple to bubble domains in said storage sheet.

19. The apparatus of claim 12, where said storage sheet has magnetically soft elements thereon and said second sheet has writing means thereon for creating magnetic fields localized near said elements on said storage sheet for nucleation of domains within said storage sheet at locations near said elements.

20. The apparatus of claim 19, where said writing means is comprised of propagation means located adjacent said second sheet for bringing together a plurality of domains in said second sheet, the combined stray magnetic field of said domains in said second sheet producing said localized magnetic field at said elements on said storage sheet.

21. The apparatus of claim 19, where said write means comprises current carrying loops adjacent said second magnetic sheet.

22. A magnetic bubble domain apparatus, comprising:

a first magnetic sheet in which said bubble domains can exist at a plurality of storage areas therein, a second magnetic sheet in which bubble domains can exist, displacement means for positioning said first and second magnetic sheets with respect to one another, writing means for creating magnetic bubble domains at selected locations in said first magnetic sheet, reading means for detecting domains located in said first magnetic sheet, transfer means for producing a domain pattern in said second magnetic sheet in accordance with a domain pattern in said first magnetic sheet.

23. The apparatus of claim 22, further including first propagation means for moving domains in said first magnetic sheet.

24. The apparatus of claim 22, where said first propagation means is located adjacent said second magnetic sheet.

25. The apparatus of claim 22, further including second propagation means for moving domains in said second magnetic sheet.

26. The apparatus of claim 22, where said transfer means includes means for bringing domains in said first sheet into transfer positions in said first sheet where said domains magnetically couple to domains in said second sheet.

27. The apparatus of claim 26, where said transfer means includes an overlay of magnetically soft elements located adjacent said second sheet, and a means for providing a reorienting magnetic field coupling said overlay elements.

28. The apparatus of claim 22, where said writing means includes means located adjacent said second sheet for creating magnetic fields at selected locations in said first magnetic sheet for nucleation of bubble domains at said selected locations.

29. The apparatus of claim 28, where said means for creating magnetic fields is a current carrying control loop.

30. The apparatus of claim 28, where said means for creating magnetic fields is comprised of means for providing at least two magnetic domains sufficiently close to one another in said second sheet that the combined stray magnetic field of said domains is sufficient to nucleate a bubble domain in said first magnetic sheet.

31. The apparatus of claim 22, where said writing means includes magnetically soft elements adjacent said first magnetic sheet at said selected locations.

32. The apparatus of claim 22, where said writing means includes a heat means for providing heat at said selected locations in said first magnetic sheet.

33. The apparatus of claim 22, including bias means for stabilizing the size of said bubble domains in said first and second magnetic sheets.

* * * * *